(12) United States Patent
Sasaki et al.

(10) Patent No.: US 7,954,334 B2
(45) Date of Patent: Jun. 7, 2011

(54) INVERTER SYSTEM AND VEHICLE

(75) Inventors: Masataka Sasaki, Hitachi (JP); Hideki Miyazaki, Hitachi (JP); Katsumi Ishikawa, Hitachinaka (JP); Keiji Maekawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 437 days.

(21) Appl. No.: 10/920,246

(22) Filed: Aug. 18, 2004

(65) Prior Publication Data
US 2005/0132726 A1 Jun. 23, 2005

(30) Foreign Application Priority Data
Dec. 19, 2003 (JP) .................... 2003-421973

(51) Int. Cl.
*F25D 23/12* (2006.01)
(52) U.S. Cl. ......... 62/259.2; 340/584; 340/589; 361/23; 361/24; 361/25; 361/26; 361/27; 361/28; 361/29; 361/30; 361/31; 361/32; 361/33; 361/34
(58) Field of Classification Search .............. 361/23–34; 62/3.2, 3.61, 259.2; 340/584, 589
See application file for complete search history.

(56) References Cited

U.S. PATENT DOCUMENTS

| 4,393,365 | A | * | 7/1983 | Kondo et al. ................. 340/449 |
| 4,970,497 | A | * | 11/1990 | Broadwater et al. .......... 340/598 |
| 5,528,446 | A | * | 6/1996 | Sankaran et al. ............... 361/25 |
| 5,721,455 | A | * | 2/1998 | Takashita ...................... 257/713 |
| 5,744,927 | A | * | 4/1998 | Hayashida ..................... 318/599 |
| 6,012,291 | A | * | 1/2000 | Ema ................................. 62/3.7 |
| 6,268,986 | B1 | * | 7/2001 | Kobayashi et al. ............. 361/24 |
| 6,465,978 | B2 | * | 10/2002 | Takahashi ...................... 318/432 |
| 6,759,964 | B2 | * | 7/2004 | Sato et al. ...................... 340/590 |
| 6,889,516 | B2 | * | 5/2005 | Sasaki et al. ................. 62/259.2 |
| 6,900,607 | B2 | * | 5/2005 | Kleinau et al. ................ 318/432 |
| 7,046,155 | B2 | * | 5/2006 | Sato et al. ...................... 340/590 |
| 2003/0230996 | A1 | * | 12/2003 | Gabriel et al. ................ 318/599 |

FOREIGN PATENT DOCUMENTS
JP 2003-134795 5/2003

\* cited by examiner

*Primary Examiner* — Frantz F Jules
*Assistant Examiner* — Azim Rahim
(74) *Attorney, Agent, or Firm* — Crowell & Moring LLP

(57) ABSTRACT

An inverter system having a semiconductor device, and a railway vehicle using this inverter, provide a more accurate determination of whether an abnormal heat generation from the inverter is associated with an error of the inverter system or is due to other causes, by use of a plurality of temperature detecting elements at a plurality of sites associated with the semiconductor device. An error detection section applies inputs from the temperature detecting elements, captures a trend of the differential value based on the plurality of temperature inputs using period sampling wherein an error associated with the semiconductor device, and not from some other condition such as outside environment temperature, is determined based on differences from, or a change in, the initial trend.

9 Claims, 4 Drawing Sheets

INVERTER SYSTEM AND VEHICLE

CLAIM OF PRIORITY

The present application claims priority from Japanese application serial no. 2003-421973, filed on Dec. 19, 2003, the content of which is hereby incorporated by reference into this application.

FIELD OF THE INVENTION

The present invention relates to an inverter system and vehicles using the same, and particularly to an inverter system suitable for detecting a temperature error of the inverter system and vehicles using the same.

BACKGROUND OF THE INVENTION

For example, as disclosed in the Japanese Patent Laid-Open No. 2003-134795, some of the prior art inverter systems are known to incorporate a temperature detecting element arranged inside the semiconductor device of an inverter system and to measure the temperature rise at the time of inverter startup; wherein, if the reading fails to conform to the reference level, the semiconductor device, hence the inverter, is evaluated as having an error, with the result that the inverter system is suspended.

SUMMARY OF THE INVENTION

However, in an inverter system mounted on a railway vehicle, particularly a vehicle having a high main circuit voltage, the main circuit voltage is, for example, 1,500 volts, on the one hand; on the other hand, the instantaneous value of the signal value from the temperature detecting element for outputting such a small voltage signal as a 5-volt signal is mixed with the noise signal caused by the main circuit voltage. Thus, when evaluation is made based on the instantaneous value as described in the Official Gazette of Japanese Patent Laid-Open No. 2003-134795, a wrong decision may result from the aforementioned noise signal. This has been a problem in the prior art.

In a vehicle such as a railway vehicle, a hybrid car and an electric car where there is a substantial change in the environmental temperature or cooling performances are subject to changes due to environmental conditions, it is difficult to determine whether or not temperature rise in the semiconductor device is caused by abnormal heat generation in the inverter. In this sense, the prior art involves a problem of leading to an incorrect decision.

The object of the present invention is to provide an inverter system and vehicles using this inverter wherein accurate detection of the abnormal heat generation from the inverter is ensured, despite a large amount of noise signals, a substantial fluctuation in environmental temperature, or a change of cooling performances resulting from the environmental conditions.

(1) To achieve the aforementioned object, the present invention provides an inverter system comprising a semiconductor device constituting a main circuit and a control circuit for on/off control of the aforementioned semiconductor device, the aforementioned inverter system further comprising:
    a plurality of temperature detecting means for detecting the temperature at a plurality of sites; and
    error detecting means for detecting an error of the inverter system through statistics processing of the output value of the aforementioned temperature detecting means.

This arrangement ensures accurate detection of the abnormal heat generation from the inverter, despite a large amount of noise signals, a substantial fluctuation in environmental temperature, or a change of cooling performances resulting from the environmental conditions.

(2) The inverter system described in the aforementioned item (1) is preferably characterized in that the aforementioned plurality of temperature detecting means further comprise first temperature detecting means and second temperature detecting means; and the aforementioned error detecting means comprises steps of:
    calculating the temperature where the aforementioned second temperature detecting means is arranged, from the output value of the aforementioned first temperature detecting means and the temperature calculation parameter inputted outside the inverter system; and
    capturing the trend of the differential value between the aforementioned calculated temperature value and the actual temperature value detected by the aforementioned second temperature detecting means, using a periodic sampling method, whereby an error is determined based on the difference from the initial trend obtained in advance or change of the trend.

(3) The inverter system described in the aforementioned item (2) is preferably characterized in that the aforementioned first and second temperature detecting means are a temperature detecting element below the semiconductor device and an outside air temperature detecting element, respectively.

(4) The inverter system described in the aforementioned item (2) is preferably characterized in that the aforementioned first and second temperature detecting means are an element temperature detecting element inside the semiconductor device and an outside air temperature detecting element, respectively.

(5) The inverter system described in the aforementioned item (2) is preferably characterized in that the aforementioned first and second temperature detecting means are an atmosphere temperature detecting element inside the semiconductor device and an outside air temperature detecting element, respectively.

(6) To achieve the aforementioned object, the present invention also provides a vehicle comprising:
    an inverter system further comprising a semiconductor device constituting a main circuit and a control circuit for on/off control of the aforementioned semiconductor device; and
    a motor controlled by the aforementioned inverter system;
    wherein the aforementioned vehicle further comprises:
    a plurality of temperature detecting means for detecting the temperature at a plurality of sites; and
    error detecting means for detecting an error of the inverter system through statistics processing of the output value of the aforementioned temperature detecting means.

This arrangement ensures accurate detection of the abnormal heat generation from the inverter, despite a large amount of noise signals, a substantial fluctuation in environmental temperature, or a change of cooling performances resulting from the environmental conditions.

(7) The vehicle described in the aforementioned item (6) is preferably characterized in that the aforementioned plurality of temperature detecting means further comprise first temperature detecting means and second temperature detecting means; and the aforementioned error detecting means comprises steps of:

calculating the temperature where the aforementioned second temperature detecting means is arranged, from the output value of the aforementioned first temperature detecting means and the temperature calculation parameter inputted outside the inverter system; and capturing the trend of the differential value between the aforementioned calculated temperature value and the actual temperature value detected by the aforementioned second temperature detecting means, using a periodic sampling method, whereby an error is determined based on the difference from the initial trend obtained in advance or change of the trend.

(8) The vehicle described in the aforementioned item (7) is preferably characterized in that the aforementioned vehicle is a railway vehicle, and the aforementioned error detecting means performs periodic sampling in the operation pattern in a specific section of the aforementioned railway vehicle.

(9) The vehicle described in the aforementioned item (7) is preferably characterized in that, if an error has been detected by the aforementioned error detecting means, the operation command value is modified so as to reduce the heat generated by the inverter.

DESCRIPTION OF THE PREFERRED EMBODIMENTS

Figure 1:
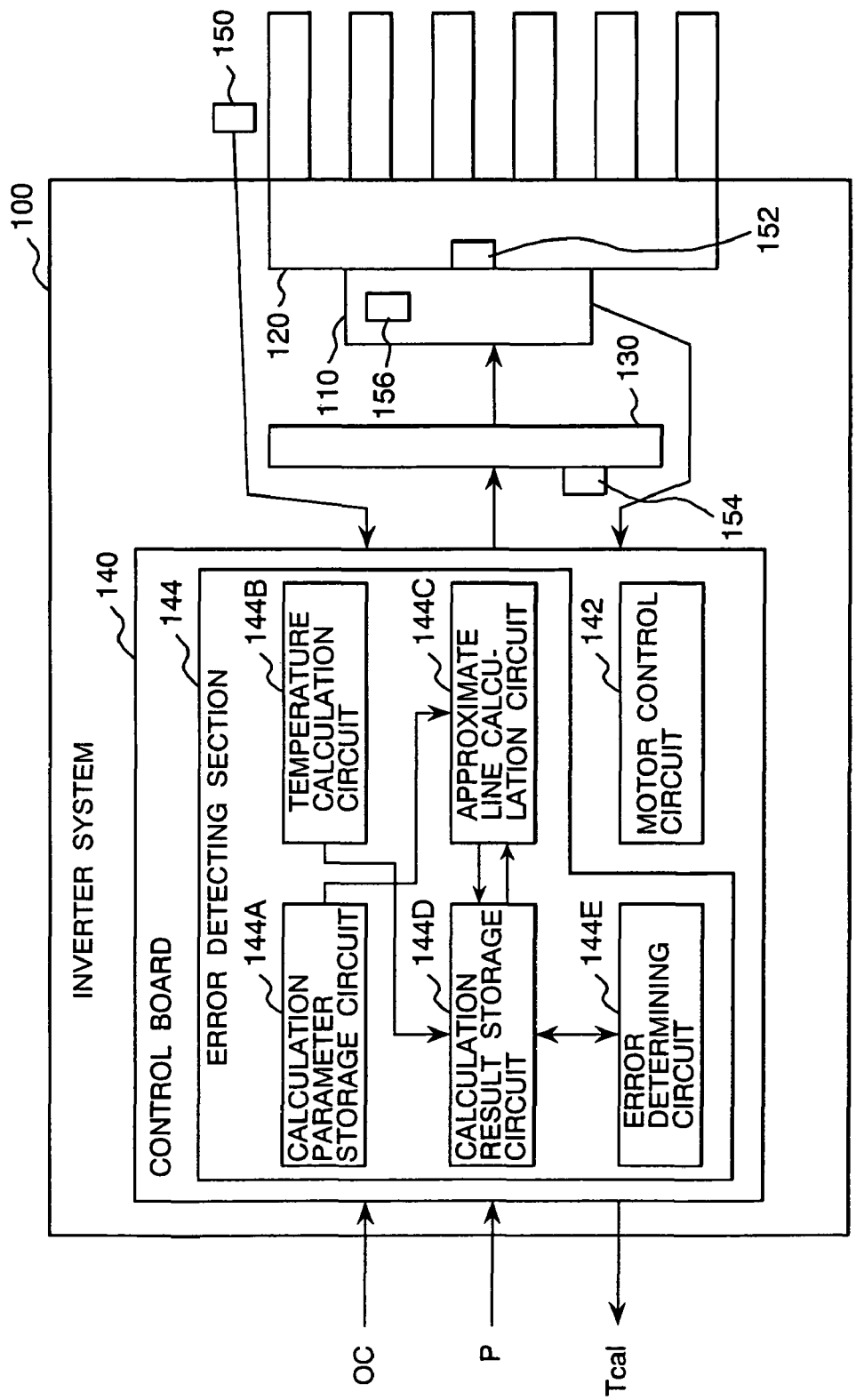
FIG. 1 is a block diagram representing the configuration of the inverter system as an embodiment of the present invention.

The following describes the configuration and operation of the inverter system as a preferred embodiment of the present invention with reference to FIGS. 1 through 4:

Referring to FIG. 1, the configuration of the inverter system as an embodiment of the present invention will be described first:

FIG. 1 is a block diagram representing the configuration of the inverter system as an embodiment of the present invention.

The inverter system 100 is equipped with a semiconductor device 110, a cooling fin 120, a gate drive circuit board (GD board) 130 and a control board 140. The semiconductor device 110 performs switching operation in response to the drive signal from the GD board to convert the dc voltage to three-phase ac voltage. The ac voltage obtained by conversion is supplied to the motor for driving such a vehicle as a railway vehicle, hybrid car and electric car. The cooling fin 120 feeds heat generated by the semiconductor device 110, outside the inverter and discharge the heat generated by the semiconductor device 110, thereby cooling the semiconductor device 110. The GD board 130 includes a semiconductor device drive circuit. The control board 140 is equipped with a motor control circuit 142 and an error detecting section 144.

The temperature detecting means include an outside air temperature detecting means 150 for detecting the air temperature outside the inverter system, and a temperature detecting means below semiconductor device 152 arranged between the semiconductor device 110 and cooling fin 120. The temperature detecting means below semiconductor device 152 can be replaced by an inverter system internal atmosphere temperature detecting means 154, arranged on the GD board 130, for detecting the temperature inside the inverter system 100 or the temperature of the components on the board, or by a semiconductor device internal temperature detecting means 156 arranged in the vicinity of such a switching element as an IGBT and MOSFET inside the semiconductor device 110. Their details will be described later.

In response to the operation command OC given from a high-order control apparatus, the motor control circuit 142 controls the semiconductor device drive circuit inside the GD board 130, the on-duty time of the switching element inside the semiconductor device 110 and the torque generated by the motor. The operation command OC indicates the vehicle target speed ($\alpha$ km/h) and motor generated torque ($\beta$ N/m).

The error detecting section 144 detects the temperature error of the semiconductor device 110 (inverter error). The details of the operation will be described later with reference to FIG. 1. The error detecting section 144 is equipped with a calculation parameter storage circuit 144A, a temperature calculation circuit 144B, an approximate line calculation circuit 144C, a calculation result storage circuit 144D and an error determining circuit 144E. The calculation parameter storage circuit 144A stores temperature calculation parameters such as parameters for calculating the temperature below the semiconductor device based on the outside air temperature detected by the outside air temperature detecting means 150 and parameters for calculating the inverter loss, as well as operation commands OC. The temperature calculation circuit 144B calculates the temperature below the semiconductor device $T_{cal}$, based on the temperature calculation parameter P stored in the calculation parameter storage circuit 144A and the outside air temperature $T_{out}$ calculated by the temperature calculation circuit 144B. The temperature below the semiconductor device $T_{cal}$ is stored in the calculation result storage circuit 144D. Based on the temperature below the semiconductor device $T_{cal}$ stored in the calculation result storage circuit 144D, the approximate line calculation circuit 144C calculates the data approximate curve used for detection of an inverter error. The calculated data approximate curve is stored in the calculation result storage circuit 144D. The error determining circuit 144E compares the data approximate curve stored in the calculation result storage circuit 144D, with the reference line obtained in advance, thereby identifying the inverter temperature error.

Figure 2:
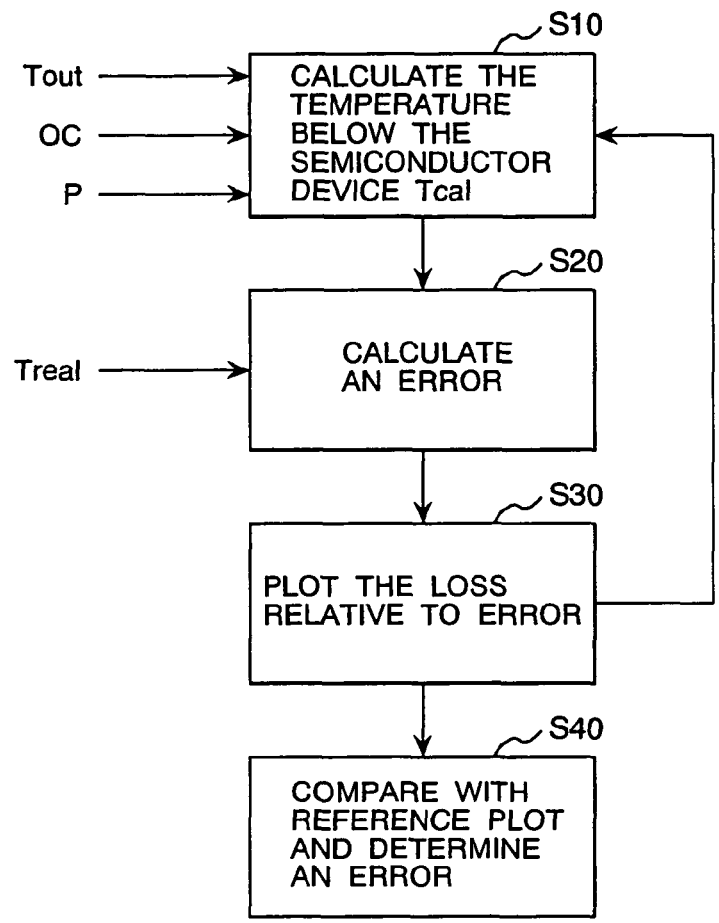
FIG. 2 is a flowchart representing the operation of the error detecting section 144 of the inverter system as an embodiment of the present invention.
Figure 3:
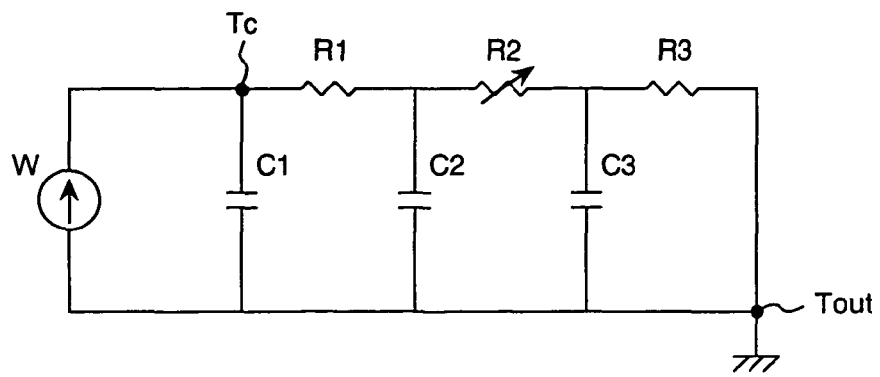
FIG. 3 is a circuit diagram representing a thermal equivalent circuit of the inverter system as an embodiment of the present invention.
Figure 4:
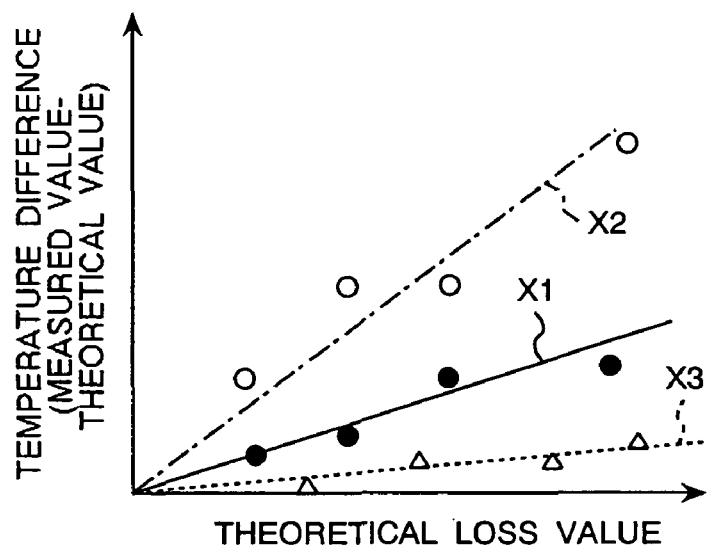
FIG. 4 is a drawing representing an example of the approximate curve calculated by the approximate line calculation circuit 144C of the inverter system as an embodiment of the present invention.

Referring to FIGS. 2 through 4, the following describes the operation of the error detecting section 144 of the inverter system in the present embodiment FIG. 2 is a flowchart representing the operation of the error detecting section 144 of the inverter system as an embodiment of the present invention. FIG. 3 is a circuit diagram representing a thermal equivalent circuit of the inverter system as an embodiment of the present invention. FIG. 4 is a drawing representing an example of the approximate curve calculated by the approximate line calculation circuit 144C of the inverter system as an embodiment of the present invention.

In Step S10 of FIG. 2, the temperature calculation circuit 144B calculates the temperature below the semiconductor device $T_{cal}$, based on the outside air temperature $T_{out}$, the operation command OC stored in the calculation parameter storage circuit, and the calculation parameter.

Here the inverter system 100 can be represented by a thermal equivalent circuit as shown in FIG. 3. In FIG. 3, semiconductor device generated heat W refers to the heat generated by the operation of the semiconductor device 110, namely, an inverter loss. The semiconductor device generated heat W indicates the target speed (α km/h) of a vehicle and is estimated from the torque generated by the motor (β N/m). The thermal resistance R2 is the thermal resistance of the cooling fin 120. The thermal resistance R3 refers to the thermal resistance between the cooling fin 120 and outside air. Further, thermal capacitance C1 is the thermal capacitance of the semiconductor device 110. The thermal capacitance C2 refers to the thermal capacitance of the cooling fin 120, and thermal capacitance C3 shows the thermal capacitance between the cooling fin 120 and outside air. Temperature $T_{out}$ indicates the outside air temperature detected by the outside air temperature detecting means 150. Temperature $T_c$ refers to the temperature below the semiconductor device 110. Thus, temperature $T_c$ can be calculated when the generated heat W, thermal resistances R1, R2 and R3, and thermal capacitances C1, C2 and C3 are given.

The following describes the aforementioned parameters with reference to the railway vehicle as one of the vehicles: Of these parameters, the generated heat W can be obtained by calculating the inverter loss from the operation command OC (the target speed (α km/h)) and the torque generated by the motor (β N/m), as described above. The thermal resistance R1 of the semiconductor device can be obtained from the dimensions and shape of the semiconductor device 110. The thermal resistance R2 of the cooling fin can be obtained from the velocity of the cooling air applied to the cooling fin 120. Generally, the cooling performance, namely, the thermal resistance of the cooling fin of the inverter cooling fin for railway car drive is changed by the velocity of air passing through the cooling fin varying with the vehicle speed. Accordingly, the cooling fin thermal resistance R2 can be obtained from the velocity of the cooling air. The fin-to-air thermal resistance R3 can be obtained in advance from the dimensions and shape of the cooling fin 120. The thermal capacitance C1 of the semiconductor device can be obtained in advance from the dimensions and shape of the semiconductor device 110. The thermal capacitance C2 of the cooling fan and fin-to-air thermal capacitance C3 can be obtained in advance from the dimensions and shape of the cooling fin 120. The outside air temperature $T_{out}$ is detected by the outside air temperature detecting means 150. Thus, temperature below the semiconductor device $T_{cal}$ can be calculated when the operation command, cooling air velocity and outside air temperature $T_{out}$ have been inputted as temperature calculation parameters, the temperature calculation circuit 144B. It should be noted that the velocity of cooling air can be obtained from the vehicle velocity.

For a hybrid car as one of the vehicles or an electric vehicle with power converter such as an electric vehicle, a water cooling method is generally used. Since the cooling water velocity is constant, the cooling performances of the cooling fan (cooling fin thermal resistance) can be obtained in advance. Accordingly, in the case of an electric vehicle with power converter, the temperature calculation circuit 144B can calculate the temperature below the semiconductor device $T_{cal}$ when outside air temperature $T_{out}$ has been inputted. When the velocity of the coolant is made variable in the water cooling system, the temperature calculation circuit 144B can calculate the temperature below the semiconductor device $T_{cal}$ when the cooling water velocity and outside air temperature $T_{out}$ as temperature calculation parameters have been inputted.

In Step S20, the temperature calculation circuit 144B calculates an error $|T_{real}-T_{cal}|$ between the real temperature below the semiconductor device $T_{real}$ detected by the temperature detecting means below semiconductor device 152 and the temperature below the semiconductor device $T_{cal}$ calculated in Step S10. This works out the temperature error with respect to inverter loss. Such a vehicle as a railway vehicle repeats the operation start and stop, and the drive inverter mounted thereon repeats power running and recuperation, and the inverter loss undergoes fluctuations over a substantial range from the vicinity of the inverter rating to a sufficiently small level. Accordingly, it is possible to accumulate the data of temperature error $|T_{real}-T_{cal}|$ for the loss over a wide range, if sampling of the temperature detection with respect to the loss is repeated at intervals of one second to perform the aforementioned temperature calculation. The result of calculation is stored in the approximate line calculation circuit 144C for each inverter loss (semiconductor device generated heat W).

In Step S30, the calculation result storage circuit 144D plots the error $|T_{real}-T_{cal}|$ of temperature below the semiconductor device $T_{cal}$ obtained in the Step S20, and obtains the approximate line using the method of least square. The approximate line is obtained for each one-day data set of railway operation.

Referring to FIG. 4, the approximate curve will be described: In FIG. 4, the solid line X1 represents a reference line calculated in advance, based on the data obtained at the time of test running. By contrast, if the thermal capacitance C1 of the semiconductor device 110 is increased by an error of the semiconductor device 110, the inclination becomes greater than that of the reference line X1, as shown by the one-dot chain line X2 in the figure. In the meantime, if the thermal resistance R1 of the semiconductor device gets greater than that of the semiconductor device 110, the inclination becomes smaller than that of the reference line X1, as shown by the broken line X3 in the figure.

In Step S40 shown in FIG. 2, based on the approximate curve stored in the calculation result storage circuit 144D, the error determining circuit 144E determines that a heat generation error has occurred, if the inclination of the approximate curve is outside the range of +10% with respect to that of the reference line, for example.

In the aforementioned description, the measured temperature has been described with reference to the temperature below the semiconductor device 110 as an example. The value detected by the temperature detecting means 154 of the GD board 130 or the temperature detecting means 156 inside the semiconductor device 110 can be used as the measured value.

Figure 5:
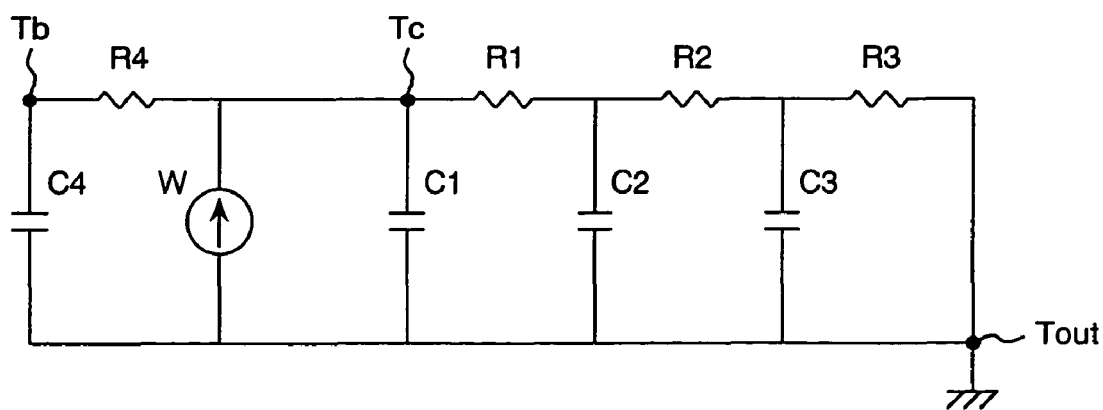
FIG. 5 is a circuit diagram representing a thermal equivalent circuit in an inverter system as an embodiment of the present invention.

Referring to FIG. 5, the following describes the case of determining the error based on the temperature detecting means 154 of the GD board 130, in an inverter system as an embodiment of the present invention.

FIG. 5 is a circuit diagram representing a thermal equivalent circuit in an inverter system as an embodiment of the present invention. The same portions as those in FIG. 3 will be assigned with the same numerals of reference.

In the present example, a thermal resistor R4 and thermal capacitance C4 are provided between the GD board 130 and semiconductor device 110, in addition to the thermal equivalent circuit of FIG. 3. Assume that the temperature detected by the temperature detecting means 154 of the GD board 130 is $T_b$, and temperature $T_b$ can be calculated from the generated heat W, temperature $T_{out}$, thermal resistances R1, R2, R3 and R4, and thermal capacitances C1, C2, C3 and C4.

When a temperature detecting means 156 is arranged inside the semiconductor device 110, the temperature inside the semiconductor device 110 can be calculated in the similar manner as described with reference to FIGS. 2 through 4.

According to the aforementioned description, an error is determined by the error determining circuit 144E inside an error detecting section 114. It is also possible to make such arrangements that data is sent from the calculation result storage circuit 144D for storing the approximate linear data through a high-order apparatus and an error is determined outside the inverter system.

As described above, unlike the case in the prior art, abnormal temperature is not determined based on the instantaneous value of the temperature in the present embodiment. It is possible to eliminate the influence of the noise generated from the main circuit voltage carried by the temperature detecting means signal by statistic processing of the output value of temperature detecting means and by making a decision according to a set of data obtained by sampling on a periodic basis over a long-term span, e.g. through the day. Further, accurate detection of a temperature error is ensured in an inverter system exposed to a substantial change in the outside air temperature in one day or in one year as in a vehicle, by detection of the temperature based on the outside air temperature for discharging the heat generated in the inverter system.

Figure 6:
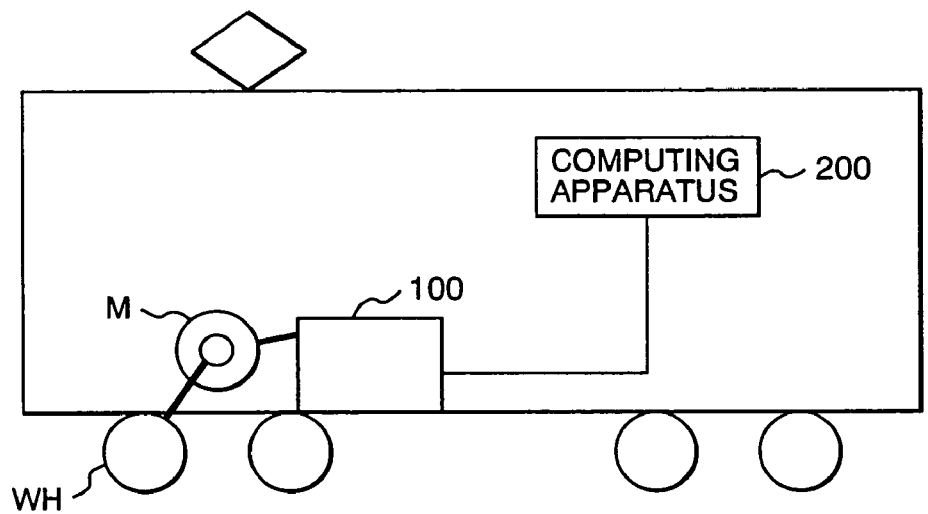
FIG. 6 is block diagram showing the configuration of a railway vehicle carrying the inverter system as an embodiment of the present invention.

With reference to FIG. 6, the following describes the configuration of the railway vehicle with an inverter system mounted thereon, according to an embodiment of the present invention:

FIG. 6 is block diagram representing the configuration of a railway vehicle carrying the inverter system as an embodiment of the present invention.

The inverter system 100 is electrically connected to the motor M for driving the wheel WH of the railway vehicle, and the motor is driven by the inverter system. The configuration of the inverter system 100 is shown in FIG. 1. An error detecting section 144 is provided to detect an error of the inverter system.

As described above, data can be sent from the calculation result storage circuit 144D to a computing apparatus 200, and error decision can be made outside the inverter system. To be more specific, a loss-to-temperature error approximate line calculated from the data for a predetermined period of time, e.g. for each day is sent to the computing apparatus 200, where it is compared with the reference line stored in the computing apparatus. It is also possible to make such arrangements that the error detecting section 144 itself is provided in the computing apparatus 200 outside the inverter system.

According to the decision made by the computing apparatus 200, the inverter is replaced before it is damaged or the operation command sent to the inverter system is modified in order to reduce heat generation, thereby preventing the railway vehicle from being damaged. For example, the torque command sent to the inverter system 100 is reduced and the heat generation of the inverter is minimized thereby. In this case, the torque command given to the inverter system 100 is assumed as a small command value barely capable of moving the vehicle from the current station to the adjacent one.

Further, it can be used in a plan for re-allocation to the track where the loss-to-temperature error approximate line is capable of coming closer to the reference line in order to extend the service life of the inverter.

A railway vehicle travels the same line every day. For example, it makes a reciprocating motion between stations A, B, C, . . . and Z. In this case, there is a difference in operation command between A and B stations and B and C stations, and therefore means may also be provided, for example, to ensure that an error is detected in one specific section (only A and B stations). In this case, a failure detection error can be reduced since the operation pattern is almost constant. This arrangement also reduces the load of computation by the error detecting section 144.

Figure 7:
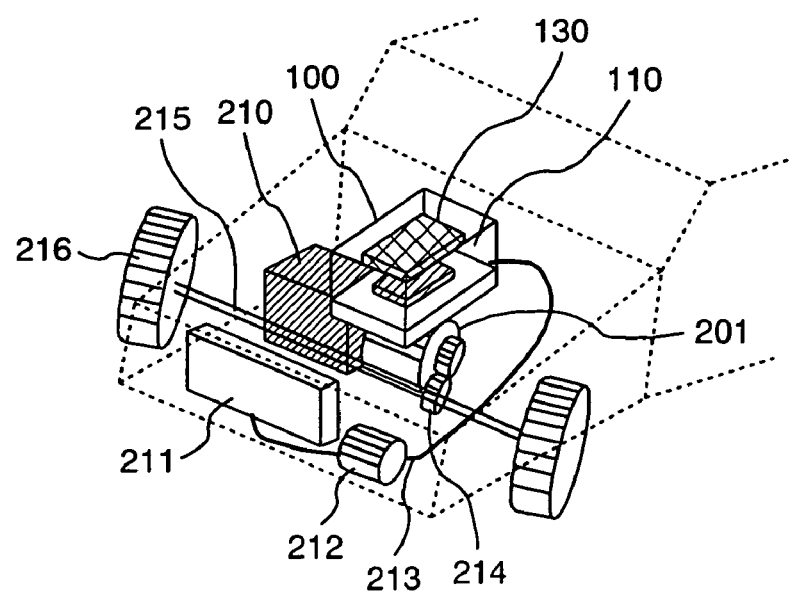
FIG. 7 is a block diagram representing the configuration of the electric vehicle with power converter carrying an inverter system as an embodiment of the present invention.

Referring to FIG. 7, the following describes the configuration of an electric vehicle with power converter. An example of a hybrid car will be taken to describe the electric vehicle with power converter.

FIG. 7 is a block diagram representing the configuration of the electric vehicle with power converter carrying an inverter system as an embodiment of the present invention.

The engine room incorporates an inverter system 100, an engine 210 as an internal combustion engine, a radiator 211, a coolant pump 212, a pipe 213, a power transmission mechanism 214 and an axle 215. Both ends of the axle 215 are projected outside the engine room and the wheel 216 is mounted thereon. The axle 215 can be rotated by any of the engine 210 and motor 201 through the power transmission mechanism 214. The inverter system 100 for driving the motor 201 is arranged close to the engine 210 and motor 201. The inverter system 100 is supplied with dc power from the dc battery. It converts the dc power to the ac power to drive the motor 201. In the water-cooled inverter, coolant temperature serves as a reference for cooling the inverter system 100, and therefore a coolant temperature detecting means, instead of outside air temperature, is installed to provide a reference for calculation. In an automobile, the loss-to-temperature error approximate line is obtained from the data collected at a predetermined time interval or at a predetermined mileage, and evaluation is made to determine whether an error has occurred or not. This arrangement prevents the inverter from being damaged.

Further, a high-order apparatus is provided, and the inverter is replaced according to the decision of the inverter system 100 before it is damaged. Alternatively, the operation command sent to the inverter system is modified in order to reduce heat generation, thereby preventing the electric vehicle with power converter from being damaged. For example, the torque command sent to the inverter system 100 is reduced and the heat generation of the inverter is minimized thereby. In this case, the torque command given to the inverter system is assumed as a small command value barely capable of moving the vehicle from the current station to the adjacent one.

The present invention ensures accurate detection of the abnormal heat generation from the inverter, despite a large amount of noise signals, a substantial fluctuation in environmental temperature or a change of cooling performances resulting from the environmental conditions.

What is claimed is:
1. An inverter system, comprising:
 a semiconductor device;
 a control circuit for on/off control of said semiconductor device;

first and second temperature detectors for detecting temperature at first and second sites, respectively; and circuitry operatively associated with the first and second temperature detectors that calculates the temperature at the second site that is at or in said semiconductor device based on:

an actual temperature value detected by said first temperature detector at the first site adjacent said semiconductor device and a temperature calculation parameter, being one of a cooling air velocity, a vehicle velocity, and a cooling water velocity, so as to capture with periodic sampling over a selected period of time a trend of a differential value between said calculated temperature and the actual temperature value detected by said second temperature detector, wherein the trend of the differential value is being given as an approximate curve formed by the plurality of differential values corresponding to a plurality of loss values in the inverter system, and that determines that an error exists in the inverter system when a difference between the captured trend and an initial predetermined trend or on a change in the captured trend over the selected period of time exceeds a predetermined value.

2. The inverter system described in claim 1 wherein said first and second temperature detectors are a temperature detecting element below the semiconductor device and an outside air temperature detecting element, respectively.

3. The inverter system described in claim 1 wherein said first and second temperature detectors are a temperature detecting element inside the semiconductor device and an outside air temperature detecting element, respectively.

4. The inverter system described in claim 1 wherein said first and second temperature detectors are an atmosphere temperature detecting element inside the semiconductor device and an outside air temperature detecting element, respectively.

5. The inverter system of claim 1, wherein a plot of said differential value versus a theoretical loss value comprises a predetermined reference line in said temperature calculation circuitry.

6. A railway vehicle comprising:
an inverter system having a semiconductor device and a control circuit for on/off control of said semiconductor device;
a motor configured to be controlled by said inverter system;
first and second temperature detectors for detecting temperature at first and second sites, respectively; and
circuitry operatively associated with the first and second temperature detectors that calculates the temperature at the second site that is at or in said semiconductor device based on:

an actual temperature value detected by at said first temperature detector at the first site adjacent said semiconductor device and a temperature calculation parameter being one of a cooling air velocity, a vehicle velocity, and a cooling water velocity, so as to capture with periodic sampling a trend of a differential value between said calculated temperature and the actual temperature value detected by said second temperature detector, wherein the trend of the differential value is given as an approximate curve formed by the plurality of differential values corresponding to a plurality of loss values in the inverter system, and that in an operational pattern in a specific section of said railway vehicle based on a difference from an initial trend or in a change of the trend to detect an error of the inverter system.

7. The vehicle described in claim 6 wherein, if the error has been detected, an operation command value is modified so as to reduce inverter-generated heat.

8. The railway vehicle described in claim 6, wherein said circuitry performs periodic sampling in the operation pattern in a specific section of said railway vehicle.

9. A method for detecting an error in an inverter system, comprising:
detecting temperatures at first and second sites in relation to a semiconductor device of the inverter system;
calculating temperature at the second site that is at or in the semiconductor device based on:
an actual temperature value detected at the first site adjacent the semiconductor device and a temperature calculation parameter being one of a cooling air velocity, a vehicle velocity, and a cooling water velocity,
so as to capture with periodic sampling over a selected time period a trend of differential value between the calculated temperature and the actual temperature value determined by said second temperature detector wherein the trend of the differential value is being given as an approximate curve formed by the plurality of differential values corresponding to a plurality of loss values in the inverter system; and
determining that an error exists in the inverter system when a difference between the captured trend and an initial predetermined trend or on a change in the captured trend over the selected period of time exceeds a predetermined value.

* * * * *